(12) United States Patent
Rorabaugh et al.

(10) Patent No.: US 6,417,125 B1
(45) Date of Patent: Jul. 9, 2002

(54) CERAMIC INSULATION

(75) Inventors: Michael E. Rorabaugh, Seattle; Darryl F. Garrigus, Issaquah; Juris Verzemnieks, Tacoma, all of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 08/464,149

(22) Filed: Jun. 5, 1995

Related U.S. Application Data

(60) Division of application No. 08/209,847, filed on Mar. 11, 1994, now Pat. No. 6,183,852, which is a continuation-in-part of application No. 08/040,217, filed on Apr. 1, 1993, now abandoned, and a continuation-in-part of application No. 07/945,191, filed on Sep. 15, 1992, now Pat. No. 5,549,850.

(51) Int. Cl.$^7$ .............................. B32B 3/12; G32G 3/06
(52) U.S. Cl. ........................ 501/95.1; 501/80; 252/62; 442/136
(58) Field of Search ............................. 264/60, 86, 87, 264/63, 324; 427/343–4, 380, 397.7, 419.1, 419.3; 501/95, 80, 95.1; 428/114; 252/62; 442/136

(56) References Cited

U.S. PATENT DOCUMENTS

| 3,702,279 A | 11/1972 | Ardary et al. |
| 3,850,670 A | 11/1974 | Gregory et al. |
| 3,935,060 A | 1/1976 | Blome et al. |
| 4,632,944 A | 12/1986 | Thompson |
| 4,737,326 A | 4/1988 | Wirth et al. |
| 4,818,448 A | 4/1989 | Wrenn, Jr. et al. |
| 4,828,774 A | 5/1989 | Andersson et al. |
| 4,935,178 A | 6/1990 | Esposito et al. |
| 5,041,321 A | 8/1991 | Bendig |
| 5,126,087 A | 6/1992 | Lespade et al. |
| 5,198,167 A | 3/1993 | Ohta et al. |
| 5,198,282 A | 3/1993 | Baker et al. |
| 5,441,682 A | * 8/1995 | Baker et al. .................. 264/86 |

FOREIGN PATENT DOCUMENTS

| GB | 2114621 A | * 8/1983 | .................. 264/87 |

* cited by examiner

Primary Examiner—Jan H. Silbaugh
Assistant Examiner—Michael I. Poe
(74) Attorney, Agent, or Firm—John C. Hammar

(57) ABSTRACT

A fibrous ceramic mat is molded from a slurry of ceramic fibers and/or ceramic micropartides and/or a metal. The mat is impregnated with a sol prior to drying. A catalyst for the sol is introduced into the mat to cause the sol to gel. The sol-gel binder forms bonds so that the mat is dimensionally stabilized. The mat is dried to produce the desired ceramic insulation that has preferably a consistent microstructure and a fully gelled sol-gel binder through its entire thickness. If we use a metal, it corrodes (i.e., oxidizes) or otherwise reacts to form a refractory binder that augments the sol and reduces the need to infuse sol incrementally to achieve strength. Using metal powder significantly reduces the cost of manufacture.

12 Claims, 3 Drawing Sheets

1/16 INCH    16 X MAGNIFICATION

1/16 INCH    16X MAGNIFICATION

1/16 INCH  16X MAGNIFICATION

1/16 INCH    16 X MAGNIFICATION

CERAMIC INSULATION

REFERENCE TO RELATED APPLICATIONS

The present application is a divisional application based upon U.S. patent application Ser. No. 08/209,847, filed Mar. 11, 1994, now U.S. Pat. No. 6,183,852, which was a continuation-in-part application based upon U.S. patent application Ser. No. 08/040,217, filed Apr. 1, 1993, now abandoned which is incorporated by reference. U.S. patent application Ser. No. 08/209,847, now U.S. Pat. No. 6,183,852, was also a continuation-in-part application based upon U.S. patent application Ser. No. 07/945,191, filed Sep. 15, 1992, now U.S. Pat. No. 5,549,850, which is incorporated by reference.

TECHNICAL FIELD

This invention relates generally to ceramic insulation and, more particularly, to rigidized refractory fibrous ceramic insulation i.e., ("fiberform" or "microform") for use in aerospace systems and methods for manufacturing such insulation.

BACKGROUND OF THE INVENTION

Various components of aerospace systems must be insulated because they may be exposed to elevated service temperatures or large temperature gradients. Ceramic insulation is applied to aircraft engine and engine exhaust components such as nose cones, firewalls and exhaust ducts to protect them and surrounding structure. Ceramic insulation is also applied to the outer surfaces of space vehicles (i.e., "space shuttle tiles") to protect the vehicle against the elevated temperatures and significant temperature gradients experienced during takeoff and re-entry.

Bending, U.S. Pat. 5,041,321, describes a method of making rigid, low-density, fibrous ceramic insulation by forming a slurry of ceramic fibers; molding the slurry to form a soft felt mat; drying the mat; incrementally introducing a sol into the mat; and gelling the sol upon each infusion. The incremental addition of the sol is accomplished through a multiple impregnation or infusion technique in which a small amount of sol is initially infiltrated into the mat, is gelled, and is cured to stabilize the mat dimensionally. Stabilizing allows handling and further processing of the mat. The partially completed mat is strengthened to its final form by infusing, gelling, and curing addition sol in the mat. Usually several infusion cycles are required to achieve adequate strength. Each infusion increases the density of the mat. This technique cures the mat to a rigid shape without appreciable shrinking of the resultant structure. Density of the final product can be controlled. Typical densities are 8–25 lb/ft$^3$.

Despite its many advantages, the method disposed in U.S. Pat. No. 5,041,321 has difficulty repeatedly producing relatively thick insulation products that have uniform structure and density. To be practical, thick insulation products should be relatively free of cracks, but cracks are a common problem with the method of U.S. Pat. No. 5,041,321. Therefore, processing improvements are desirable to improve the quality of these products and to reduce their cost of manufacture.

SUMMARY OF THE INVENTION

One aspect of the present invention is a thick fibrous ceramic insulation with consistently reproducible properties that could not consistently be made using previous methods. In another aspect, the invention is a method which more consistently produces crack-free insulation having more uniform structure and density and improved strength. The present method permits an increased forming rate and maintains a uniform distribution of constituents in the slurry (and the insulation), although its constituents may have different densities. Metal particles can be included in the slurry. The metal particles are oxidized or nitrided in-situ to form a refractory binder or to enhance the sol binder. The refractory metal oxides or nitride reaction products augment or replace ceramic whiskers often included in the slurry.

Briefly, the invention is directed to a process for forming ceramic insulation and the product obtainable by that process. The steps of the process include forming a slurry of ceramic fibers and/or microparticles and/or metal particles; molding the slurry to form a soft felt mat; impregnating the mat with a sol prior to drying the mat; gelling the sol to form sol-gel glass binder bonds so that the mat is dimensionally stabilized; and drying the mat to produce the desired ceramic insulation product. If metal particles are used, there is an oxidation or nitriding step to convert the metal to a refractory ceramic product.

The invention is also directed to a process including adding a dispersant and/or a flocculant to the slurry and, otherwise, completing the ceramic insulation as described.

The invention is further directed to a process in which the slurry is formed and molded to form a mat followed by infusing a catalyst into the undried mat to initiate gelling of the sol to its sol-gel binder state. The infused mat, then, is dried to produce the desired ceramic insulation.

The invention is still further directed to a process for forming a mat from the slurry by injecting the slurry into a mold with sufficient back pressure to force a portion of the liquid out of the slurry through a porous surface of the mold and to leave a mat on the porous surface.

A further aspect of the invention is a slurry used in the processes for forming ceramic insulation. The slurry includes ceramic fibers and/or microparticles and/or metal particles, water or another appropriate carrier fluid, and, optionally, a dispersant, a flocculant, or both.

Finally, the invention is directed to ceramic insulation having consistent microstructure and improved strength. The low-density insulation includes ceramic fibers, microparticles, or mixtures thereof and a sol-gel binder which is fully gelled through the entire thickness of the insulation. The methods of the present invention permit the reproducible preparation of thick sections without serious cracks or other defects.

DETAILED DESCRIPTION OF THE INVENTION

Figure 1:
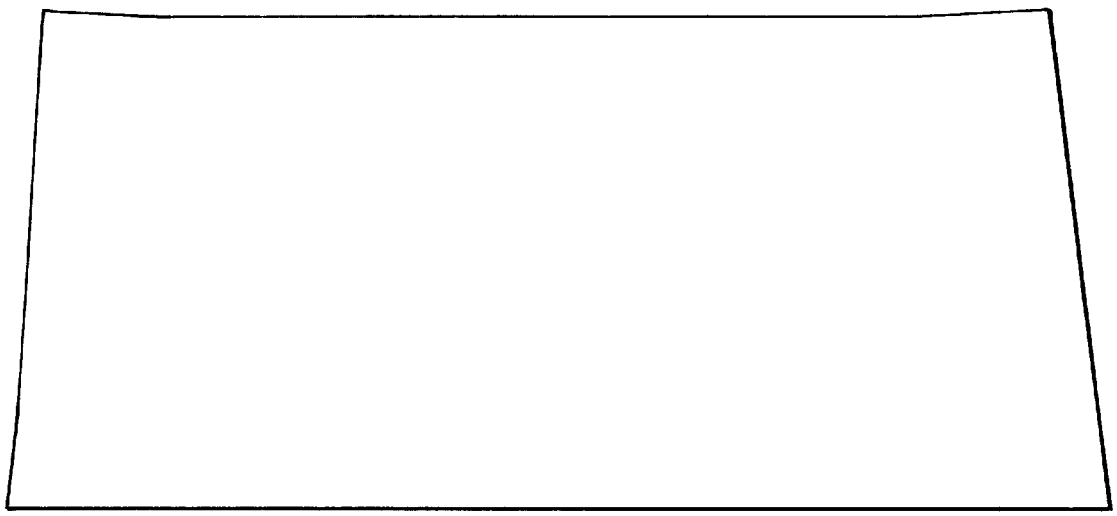
FIG. 1 is a drawing based on a photograph showing a cross section of the insulation of the present invention.

The present invention provides improved ceramic insulation and improvements for sol-gel techniques for forming such insulation, in particular for sol-gel techniques of the type disposed in U.S. Pat. No. 5,041,321, which is incorporated by reference.

The ceramic insulation of the present invention is usually formed from an aqueous slurry of ceramic fibers, ceramic micropartides, metal partides, or mixtures thereof. "Microparticles" is used to mean microballoons, solid particles, flakes, diatoms, whiskers, and the like, or combinations thereof. Although fibers may be omitted to produce insulation consisting only of microparticles and sol-gel binder, the preferred insulation is fibrous ceramic insulation incorporating ceramic fibers or ceramic fibers in combination with microparticles. For simplicity we will-refer to fibers but, in doing so, intend to include microparticles unless from the context it is dear that microparticles are excluded. The metal particles function much like ceramic whiskers in the insulation product. They can augment or replace either (1) including such ceramic whiskers in the slurry or (2) binding the fibers and/or microparticles with the sol. Suitable metal particles for this application include pure metal, intermetalic, and alloy powders of aluminum, aluminum/magnesium (2:1), aluminum/silicon (2:1), aluminum/yttrium (5:3), cerium, silicon, tantalum, yttrium, or mixtures thereof. For extremely reactive metals, alcohol might replace water as the carrier in the slurry, but such substitution is not preferred for safety and health reasons. The particle size and quantity of the metal powder will be significant for stability in the suspension, reactivity to its oxide, nitride, or other refractory ceramic product, and effectiveness of the refractory ceramic product as a binder.

The preferred insulation is formed from a slurry of ceramic fibers such as aluminosilicate, alumina, mullite, zirconia, silicon nitride, or mixtures thereof. Other ceramic fibers may be used as desired Suitable fibers include HS-95C and HSA fibers available from the Carborundum Corporation (Niagara Falls, N.Y.) and NEXTEL 440 fibers available from 3M Company (St. Paul, Minn.) Different fiber mixtures may be used to tailor the insulative characteristics of the final product. For instance, insulation having distinct layers of alumina and aluminosilicate fibers is more effective at higher temperatures than certain other insulation. Different fiber mixtures may also be used to tailor the properties of the final product. For example, the combination of silica and alumina fibers provides low thermal conductivity with higher strength that can be achieved with silica fibers alone.

Fibers are selected which have the geometry and packing density to impart the desired characteristics to the final product. Among the insulation's properties affected by the morphology of the fibers and their packing density are mechanical strength, density, thermal conductivity, and filtration characteristics. In general the use of longer fibers results in insulation of increased mechanical strength. The use of shorter fibers results i[008e] a slurry of higher solids content and, ultimately, insulation of higher density. For most applications the individual fibers have a diameter between about 0.5–10.0 micrometers, a length of less than about 6.4 millimeters, and an aspect ratio (length:diameter) between about 5:1 and 3000:1, although a small percentage of fibers outside these ranges is tolerable. Longer fibers within the slurry can break in the mechanical means used to mix and pump the slurry. In breaking, longer fibers usually yield fragments; within the preferred range.

Incorporation of glass microballoons in the slurry can produce insulation of improved mechanical strength, lower dielectric constant, and more isotropic properties. Glass microballoons are available in many sizes and are generally hollow spheres made from various glass compositions with various wall thicknesses. Solid particles of the same general dimensions as the hollow microspheres can be used, but, of course, they are heavier than their hollow counterparts and, because of their increased weight, in a trade with mechanical properties, they do not alter the mechanical properties of the insulation product sufficiently to justify their use over hollow microballoons. Glass microballoons suitable for this purpose include ECCOSPHERES available from Emerson and Cuming, Inc. The incorporated glass microballoons are usually in the range of 5 to 200 micrometers in diameter, and, preferably, in the range of 5 to 50 micrometers in diameter. They also generally have a crush strength in the range of 3.4 MPa to 31 MPa (500 to 4500 psi). These microballoons do not have pores so their density is not increased by absorption of sol; the sol simply coats the outside. The mechanical compressive strength of insulation combining fibers with microballoons is increased because the microballoons support the fibers. Without microballoons, most of the fibers are oriented in the x-y plane (the z-axis being aligned with the thickness of the mat) because of the felting process. With microballoons, overall isotropy is improved in that the insulation can exhibit similar properties in the x-y, x-z, and y-z planes. In addition, being spheres, the microballoons are similar in all planes.

To introduce fine, uniform porosity or voids throughout the mat, we sometimes include fugitive microballoons, such as phenolic microballoons, in the slurry. Fugitive microballoons are removed from the insulation by heat treatment (i.e. "burn out") of the insulation above their decomposition temperature of the fugitive microballoons. The resulting insulation has a lower density without significantly or adversely reducing its strength. Suitable phenolic microballoons for this purpose include UCAR Thermoset Microballoons available from Union Carbide.

We sometimes also include diatoms in the slurry in place of or in addition to microballoons for purposes of strengthening the final structure. Diatoms are the porous silica inner support structure (i.e., "skeleton") of certain marine and fresh water algae. They typically, have diameters between about 5 and 50 micrometers. Unlike microballoons, diatoms usually absorb sol because they have pores or are discontinuous. Absorbed sol leads to density increases or density discontinuities. Diatoms might be more acceptable, then, when metal particles are used as the binder mechanism in place of the sol since the problems of sol absorption will be reduced.

We sometimes use whiskers, such as silicon carbide, silicon nitride, or alumina whiskers, in the slurry and final insulation. Ceramic whiskers can increase the insulation's modulus and toughness. Whisker additions allow fabrication of lower density materials without loss of mechanical properties. The whiskers generally have an average aspect ratio of about 100:1 and diameters of about 0.1 to 1 micrometer. Micropartide enhanced fibrous ceramics incorporating microballoons, diatoms, and whiskers are disclosed in commonly assigned U.S. Pat. No. 5,441,683, which is incorporated by reference. Metal particles can serve the function of ceramic whiskers and are much less expensive, so using metal particles that have been reacted to form a refractory ceramic product (e.g., an oxide or nitride) is preferred in some applications.

The slurry of ceramic fibers and microparticles is mixed in a mechanical mixer or with a sonicator to provide a substantially uniform dispersion. The optimum concentration of the slurry will depend on the fibers and microparticles and the choice of the carrier fluid, which preferably is water. The concentration must be low enough to provide a free flowing slurry. Also, the concentration must be sufficient to expedite the forming process, to trap microparticles, and to encourage fiber entanglement during forming to optimize z-axis strength. If whiskers are used, they typically constitute from about 5–50% of the total combined weight of the fibers and micropartides. If metal particles are used, they typically constitute from about 5–50% of the total combined weight of the fiber and microparticles, similar to the use of the whiskers.

As part of the mixing process, dispersants can be added to the slurry. Dispersants loosen agglomerations of fibers and other species in the slurry and thereby facilitate thorough mixing. Dispersants are especially useful for achieving complete dispersion of extremely small, agglomerated reinforcing whiskers and reduce the need for high energy mechanical mixing which may damage the fibers. The dispersants impart a charge to particle surfaces within the slurry such that repulsive forces exist between particles. Suitable chemical dispersants include ammonium and sodium polyelectrolytes such as Daxad 37LN10 (available from W. R. Grace Co., Lexington, Mass.), deflocculants from the Dispex family (Allied Colloids, Yorkshire, England) and Darvan C (RT Vanderbilt, Norwalk, Conn.) and various lignosulfonates. Dispersant is added in an amount which is effective for achieving the desired degree of dispersion. Although the amount of dispersant required varies depending on the selected dispersant and the characteristics of the slurry (including the nature and amount of fibers and microparticles in the slurry), typically on the order of 5–100 parts dispersant per million parts slurry by volume are required. For many applications the selected dispersant should be of such a nature that, when used in the required quantity, it does not leave a significant inorganic residue on the partides that cannot be removed by thermal treatment.

The slurry may be gently mixed to minimize damage to the fibers or, alternatively, vigorously mixed to break the fibers and to form a more uniform distribution. The choice rests with the characteristics of the raw materials and the properties desired in the product.

Flocculants may be added to the slurry to prevent the tangling of fibers into hard clumps which hinder uniform packing of the material upon part formation. The flocculant is preferably added to the slurry immediately after the slurry has been thoroughly dispersed such that the fibers and microparticles within the slurry do not have an opportunity to settle and segregate. Suitable flocculants include cationic and anionic polymers such as Daxad CP-2 (available from W. R. Grace Co., Lexington, Mass., Magnifloc 1598 (American Cyanamid, Co., Wayne, N.J.), and other products of the Magnifloc family such as 1883A, 592C, and 515C. As with the dispersant, it is usually necessary that the selected flocculant be of such a nature that, when used in the required quantity, it does not leave significant inorganic residue on the particles that cannot be removed by thermal treatment. The flocculant is added in an amount which is effective for achieving the desired degree of flocculation. Although the amount of flocculant required varies depending on the selected flocculant and the characteristics of the slurry, typically on the order of 5–100 parts flocculant per million parts slurry by volume are required. Flocculants place charged species on the surface of fibers and, perhaps on other particles within the slurry. Such charges help prevent entanglement of the fibers by providing weak attractive forces between the individual fibers, thereby helping to develop and maintain a loose structural network of fibers within the slurry. We believe this loose structural network effecitvely traps microparticles and thereby minimizes segregation which can occur due to settling and floating. Without flocculants, denser materials may tend to separate out of the slurry mixture into less agitated locations in the mixing chamber, and microballoons may tend to float to the surface of the slurry. Shorter fibers can (which are otherwise subject to unwanted settling) be used in forming fibrous ceramic insulation if flocculants are used to reduce the settling and related filtering problems. Flocculants also reduce or eliminate the need for fiber-felting aids, such as those disclosed in U.S. Pat. No. 5,041,321, which were sometimes used with shorter fibers. Furthermore, flocculants counteract the potentially detrimental segregation and settling tendencies of a well dispersed system.

The combined effect of using dispersants followed by flocculants is, first, to break up agglomerations of the system's components such that they can be thoroughly mixed to form a consistent slurry throughout and, then, to prevent settling and segregation of the components thereby maintaining the slurry in this preferred condition. This process therefore facilitates the production of more uniform parts that have consistent microstructure because the fibers and microparticles are uniformly distributed throughout.

After flocculation, the slurry is felted into a soft felt mat having intersecting ceramic fibers, preferably by sucking the slurry through a filtered mold. The mold and associated tooling is, for example, an aluminum box having a screen on one side with a frame which defines the shape of the part to be formed and a pump for creating a reduced. pressure on the other side of the screen. As the water in the slurry is sucked through the screen, a felt mat is formed which conforms to the shape of the mold. The felt mat can be formed in a variety of shapes, including those with irregular, curved surfaces, complex curvature, or open interiors (such as hollow cylinders and cones).

As an alternative to vacuum formation of the mat, a positive pressure on the slurry side of the screen may be used to push the carrier out of the slurry through the screen, thus forming the mat against the screen. The use of positive pressure can increase the forming rate, which is particularly important for thick sections where the mat creates a significant pressure drop as it grows on the screen. Controlling the pressure throughout the forming period can also provide increased density through the thickness by controlling the pressure gradient at the surface of the mat facing the slurry. As a further alternative, vacuum and positive pressure may be used simultaneously. The mechanism and total pressure difference involved can be selected depending on the desired rate of production and insulation density.

The term "sol" has its accepted technical meaning; a solution comprising the dispersion of a solid phase in a carrier liquid, the solid phase being of molecular or colloidal particle size. The term "gel" has its accepted technical meaning; a sol that is polymerized by thermal or chemical means into a porous solid. A "gel" is flexible and can be handled. We use "sol-gel" to refer to the process, inducing the use of sols and subsequent polymerization, used to incorporate an inorganic binder (matrix) in a felted fibrous ceramic preform (mat).

We often use "particles" and "fibers" interchangeably (i.e., as synonyms) especially when referring to the constituents of the felt mat. Please understand that the mat can be all fibers, all particles, or mixtures of fibers and particles irrespective of the shorthand names we use in the specification.

In Boeing's earlier patents that are incorporated by reference, we described methods for making fiberform or microform, porous, ceramic felted mats rigidified with sol-gel binders to link the fibers, particles, or mixed fibers and particles much like glue but typically through glass forming ceramics rather than organic resins. The sol-gel ceramic binders which are used and which can be cured to form a ceramic are known in the art. For example, U.S. Pat. No. 3,640,093 discloses a method of preparing silicon oxides by forming a gel from hydrolized silicon alkoxide and a metal salt. Various sol-gel binders which can be used in the present invention include conventional sols and sol-gels used to form alumina, silica, mullite, zirconia, alunimoborosilica, silicon nitride, a $LaMnO_3$ family sol (as described in U.S. Pat. No. 5,549,850, which is incorporated by reference), a 1-2-3 superconductor sol, or mixtures thereof.

The felted mat is generally impregnated with a sol which forms a ceramic solgel binder, i.e., a liquid solution which can be polymerized into a solid by thermal or chemical means. The sol-gel binder forms ceramic bridges between the fibers and/or microparticles. The sol is preferably an alumina precursor. Yoldas, *Alumina Sol Preparation*, Ceramic Bulletin, Vol. 54, No. 3,1975, p. 289–90, describes certain conventional techniques for preparing an alumina sol-gel glass binder.

If the mat contains metal particles (or the equivalent), the sol-gel binder step might be-replaced with a reaction step to convert the metal to its ceramic oxide or nitride. An oxidation (i.e., corrosion of the metal) can be promoted simply by the water of the slurry in contact with the metals, like aluminum, or in an oxygen-rich environment. The mat sometimes simply may be soaked in water to convert the metal to the oxide. Alternatively, the mat can be heated in controlled conditions (atmosphere and temperature) where it will react to form a refractory oxide, carbide, nitride or will act as a catalyst for whisker formation in situ by the well know vapor-liquid-solid (VLS) mechanism. Finally, the conventional sols used as binders can be infused into the mat to promote corrosion of the metal partides because the sols are generally aqueous hydrochloric acid solutions of about pH 5.0. We prefer to use metal particles in combination with the sol-gel binder rather than in place of it. The metal oxide is an in situ refractory binder (judging from our measurements of comparable strengths). Using metal particles to improve the binding increases strength without significantly increasing the density. We have found that incremental infusions of sol-gel binder to increase strength increases the density beyond the range we prefer. Including metal particles that corrode in situ to a binder may permit us to achieve both the desired strength and density.

Corrosion of metals to form an oxide matrix in a ceramic fiber preform has previously been used in the Lanxide process where a molten metal is infused into the preform before controlled corrosion to its oxide. The Lanxide process, however, is impractical for making low-density ceramic insulation.

While we prefer using metal particles, the metal component in the insulation can be introduced in alternate ways. For example, we might include metal coated fibers to introduce the metal or, for the VLS mechanism, we might include soluble metal salts in the slurry carrier. Of course, we can use mixtures of these three alternates.

U.S. Pat. No. 5,041,321 discloses a process that calls for drying the mat after its formation and then introducing sol into the mat. Advantages are attained by introducing binder into the mat (that is, infiltrating sol into the mat and gelling the sol) before the mat is dried. In particular, strengthening the mat with sol-gel binder prior to drying improves the insulation's structural integrity. Accordingly, a sol may be drawn into the mat in a vacuum impregnation or positive pressure operation similar to the manner in which the carrier is drawn (or pushed) through the mat during forming. Sol impregnation can alternatively be accomplished by spraying or wicking which is driven by capillary forces. The binder displaces the carrier (usually water) in the system and ensures that the fibers and other components are bound together during drying, thus preventing deformation of the part and disruption to its microstructure. The introduction of binder prior to drying results in a more stable microstructure having reduced average void size as compared to prior procedures. In the absence of binder, deformation can occur during drying due to the loss of capillary forces and fluffing of the mat's fibrous and microparticle components Sol infusion prior to drying apparently reduces the tendency for thick sections to crack.

Following the first sol infiltration, gelling the sol to form the binder is preferably initiated in the present process by placing the part in an atmosphere containing a catalyst for gelling of the binder. The preferred atmosphere is flowing concentrated anhydrous ammonia gas. Ammonia dissolves in the sol and catalyzes complete gelling (that is, conversion of the sol to a gel which is not fluid or viscous, but which is elastic and handleable). In general, the part is exposed to flowing, concentrated ammonia for on the order of about 0.5 to 4 minutes per centimeter of part thickness, preferably for about 0.5 to 3 minutes per centimeter of part thickness, and, more preferably for about 0.5 to 2 minutes per centimeter of part thickness or the equivalent thereof. Significantly greater exposure to ammonia, such as exposing the part to concentrated ammonia for 12 minutes or more per centimeter of part thickness, may result in overexposure to ammonia and damage as described below. In addition, the optimum exposure time per centimeter of part thickness decreases as the thickness of the part increases to avoid overexposure to ammonia. Thickness in this context refers to the smallest effective dimension of the part, which for most shapes formed by this process is the dimension of the part which is perpendicular to the plane defined by the screen used during forming. For parts of irregular shape and of varying thickness, the details of the ammonia exposure are determined by the details of the part's configuration. The selected ammonia exposure time is sufficient to ensure that enough ammonia is supplied to gel the thickest cross section of the part, but is not so long that thinner sections are overexposed.

The part is exposed to ammonia by placement in a chamber containing circulating ammonia. A suitable chamber is an ammonia-tight (i.e., nonpermeable or nonflow-through) bag, enclosure, or similar device having an inlet to which ammonia gas is constantly being supplied to replace ammonia diffusing into the part. Another suitable chamber is a flowing ammonia system constantly supplied with concentrated flowing ammonia. Because this latter system maintains a high concentration of ammonia at the part's surface, the required exposure time is slightly less than in the bag system where the ammonia is relatively static.

After the part is exposed to ammonia, it is subjected to an ammonia soak time, that is, a period of time to allow for ammonia to diffuse to the center of the part. During this period, the sol-to-gel transition, that it, gelling, is completed. Some gelling occurs during the ammonia exposure period, but the majority of gelling occurs during this subsequent ammonia soak time. As the sol-to-gel transition is completed, the sol-gel binder forms bonds at the intersections of the ceramic fibers so that the mat is dimensionally stabilized. Without this soak time, a risk exists that the gel will not be complete prior to subsequent drying and that ungelled sol will migrate from the center of the part during such drying, resulting in a weakened center. The length of the ammonia soak time is greater than about one-half hour per centimeter of part thickness, preferably over 1.5 hours per centimeter of part thickness, and more preferably over 1.5 hours per centimeter of part thickness, and more preferably about 3 hours per centimeter of part thickness. The optimum soak time per centimeter of part thickness for a given part is dependent upon the thickness of the part and initial ammonia exposure conditions, and, in general, increases as the thickness of the part increases. This ammonia soak is preferably carried out in a sealed bag at room temperature. For particular embodiments of the invention, preferred ammonia exposure and soak times are presented in Table 1.

TABLE 1

| Part Thickness (cm) | Maximum Flow Duration (minutes) | Minimum Soak Time (hours) |
| --- | --- | --- |
| 1.25 | 2 | 2 |
| 2.5 | 4 | 5 |
| 5 | 8 | 14 |
| 7.5 | 12 | 24 |

Exposure of the part to ammonia and the ammonia soak time in this process occur at relatively low pressure, that is, about atmospheric pressure or slightly above, such that the ammonia is allowed to freely diffuse into the part. Allowing sufficient time for diffusion ensures complete gelling of the sol throughout the part without overexposure to ammonia. Certain prior art methods dry the part immediately after ammonia exposure or rely on vacuum or pressure infiltration of catalyst to gel the sol. Forcing ammonia into the part using a pressure difference to create flow is avoided in this invention because such a process will displace sol from the mat.

Controlling ammonia exposure and soak time helps prevent the formation of defects. If too much ammonia is dissolved in the sol, cracks and voids result from volume expansion of ammonia-rich sol.

Further problems stem from processing without a catalyst or from not allowing sufficient time for the catalyst to diffuse throughout the part. In such cases the sol does not completely gel. Binder will migrate to surfaces where, during drying, water and ammonia are evaporating, and will leave internal regions of the part binder-deficient. Localized binder deficiency can result in weakened regions of the insulation and deformation due to fluffing during drying. Migration of binder to the part's surface can also produce a dense, binder-rich surface which hinders subsequent infiltration cycles or may require that the binder-rich region be removed by machining prior to subsequent infiltration cycles. The gelling process of this invention prevents migration of the binder during drying. Therefore, in the present process, a homogeneously distributed gel forms bonds at the intersections of the ceramic fibers during drying so that the mat is dimensionally stabilized. This process promotes the production of insulation which is fully gelled, crack-free, of uniform density, and of consistent microstructure. The uniformity and consistency of this insulation results in improvement of its overall strength in that there are no localized regions significantly weaker relative to the insulation as a whole.

As an alternative to using anhydrous ammonia gas, an aqueous ammonium hydroxide solution or another ammonia-precursor catalyst solution can be used to catalyze gelling. In particular, $NH_4OH$ can diffuse into the part by submerging the part in a 0.5 to 5 wt % solution for a time sufficient for the entire part to achieve the desired ammonia concentration, about 1–20 hours per 2.5 centimeters of part thickness. This submersion achieves the exposure to and diffusion of catalyst achieved by the combined exposure and soak times previously described. Submersion in ammonium hydroxide solution allows the maximum catalyst concentration in the part to be specifically limited by control of the solution concentration. In contrast, there is no such control when using concentrated ammnonia gas because a high ammonia concentration at the part's surface results initially, though it diminishes after the part is removed from the ammonia-rich atmosphere and as the ammonia diffuses into the part. Submersion in ammonium hydroxide solution may therefore be advantageous for production of, for example, irregularly shaped parts having disparate thicknesses where the ammonia gas exposure time required for processing thicker sections would result in overexposure of thinner sections. Other sols may be gelled by other catalysts as will be recognized by those skilled in the art.

The catalyst may even be added to the sol prior to infiltration in some cases. For example, ammonia may be bubbled into the sol in a high speed mixer until the mixture reaches a pH of about 5.5. The mat is then impregnated with sol and the catalyst simultaneously. The resulting sol is initially fluid but it completely gels in about 3 hours. A similar result can be achieved by incorporating into the slurry hexamethylenetetramine (HMT), which releases ammonia when heated. Upon heating, the HMT will catalyze gelling. These alternative methods may be preferred in certain applications where the thickness or configuration of the part would otherwise require lengthy ammonia flow durations and soak times.

After gelling is complete, the soft felt mat, usually without the mold, is dried and cured in a combined operation that we call drying, wherein residual moisture is removed from the part and the gel is cured (that is, caused to harden to its final, rigid structure). The mat is dried after gelling, rather than before, so that the problems described above with respect to deformation, dimensional stability, and binder migration are avoided.

Drying is accomplished in a ramped thermal cycle by heating to a temperature between about 66° C. (150° F.) and 100° C. (212° F.) in several hours, preferably about 4 hours, holding at that temperature until the physically bound water is evaporated, and slowly increasing the temperature to above about 316° C. (600° F.), where it is held for several hours, preferably at least about 4 hours, and subsequently reducing the temperature to ambient temperature. Drying removes all water from the mat and stabilizes the gel. Drying time can range from minutes to days depending on the initial water content of the mat. Holding the insulation for a period at or above about 316° C. (600° F.) ensures that water which is chemically bound within the gel is removed and that the binder is stabilized with regard to water damage. The required drying time will depend on the size, especially the thickness, and shape of the mat. Parts which are several centimeters thick should be held at or above about 316° C. (600° F.) for 4 hours or longer. If chemically bound water is not completely removed, water may dissolve uncured sol upon re-infiltration, as described below.

After drying, the part may again be subjected to sol infiltration, ammonia exposure, ammonia soak, and drying. Additional cycles increase the mechanical strength of the insulation, but also increase its density, as the additional binder fills voids: Optimization of these properties therefore dictates the number of infiltration cycles. Typical operation involves 2–5 total infiltration cycles. Three total cycles may result in, for example, insulation having a density of 0.35 g/cm$^3$ (22 lb/ft$^3$). Fibrous insulation having a density of 0.35 g/cm$^3$ would be expected to be approximately 90% void and 10% binder, fiber and microparticles, by volume.

The practice of repeated sol infiltrations is facilitated by this invention's process of controlled ammonia exposure, as opposed to vacuum or pressure infiltration. A part which has undergone sol infiltration, gelling, curing, and re-infiltration steps does not have an abundance of passages for ammonia to flow through. Forcing ammonia through the part by vacuum or pressure infiltration, therefore, presents the risk that sol will be displaced as ammonia is forced into the part. Allowing the ammonia to diffuse into the part, and avoiding any significant pressure differential, in contrast, ensures that displacement of sol by ammonia in this manner is avoided, since only an amount of ammonia which can readily infiltrate the part is actually introduced.

As a final operation the insulation may optionally be subjected to a high-temperature heat treatment. Such heat treatment serves to further stabilize the insulation and to prevent shrinkage during subsequent high-temperature service. Stabilization is brought about by continued structural development of the sol gel binder. The preferred heat treatment occurs at a temperature at least about 55° C. (100° F.) above the intended service temperature and for a period which results in suitable stability of the part. For example, if insulation manufactured according to this invention is expected to perform in service temperatures of about 816° C. (1500° F.), it is preferable that it undergo heat treatment at a temperature at least about 871° C. (1600° F.). High-temperature heat treatments can increase the strength of the insulation and may be performed on materials intended for lower temperature applications.

By forming insulation in accordance with the procedures of this invention, fibrous ceramic insulation is produced which is fully gelled, of uniform density, and free from process-induced internal damage such as cracks, delimitation, or large voids. These parts also have consistent microstructure in that their constituents are uniformly distributed throughout. Because the insulation is of consistent structure and fully gelled through its entire thickness, it is uniformly stronger throughout and does not comprise a central region which is inherently weaker than surface regions. Tensile tests on this insulation have shown it to have a z-axis tensile strength of at least about 0.17, 0.21, and 0.24 MPa (25, 30 and 35 psi). Furthermore, these properties are produced in relatively thick parts, even greater than 5 and 7 centimeters thick.

Figure 2:
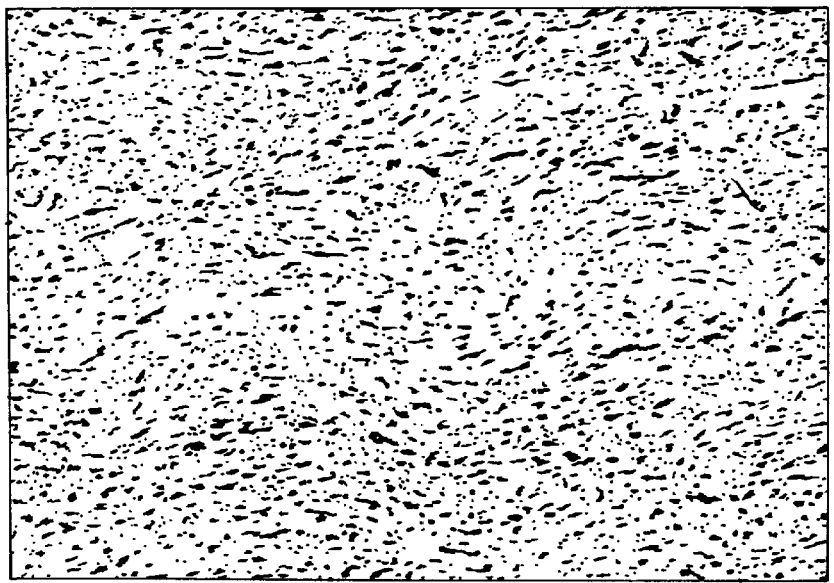
FIG. 2 is a drawing based on a photomicrograph showing a cross section of the preferred insulation of the present invention.
Figure 3:
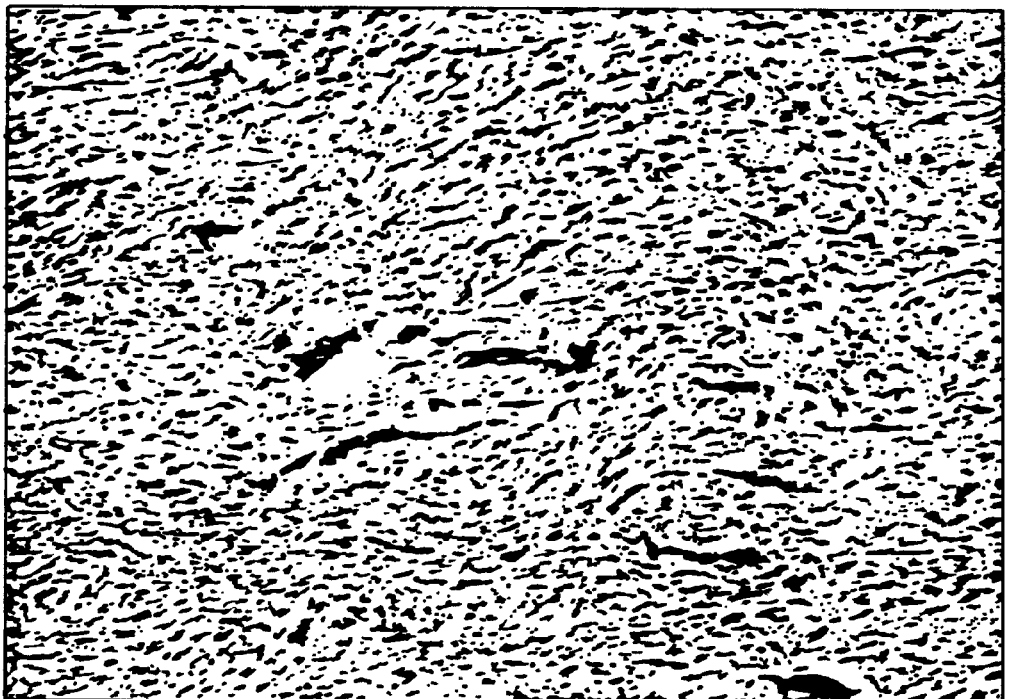
FIG. 3 is a drawing based on a photomicrograph showing a cross section of prior art ceramic insulation having a defect.
Figure 4:
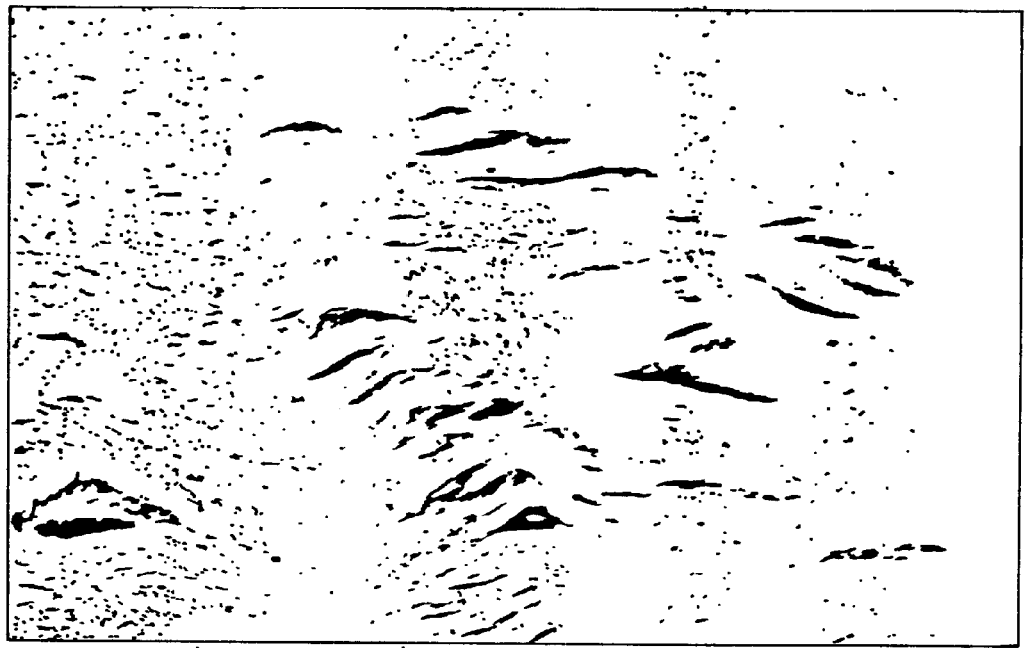
FIG. 4 is another photomicrograph showing a cross section of prior art insulation having another defect.
Figure 5:
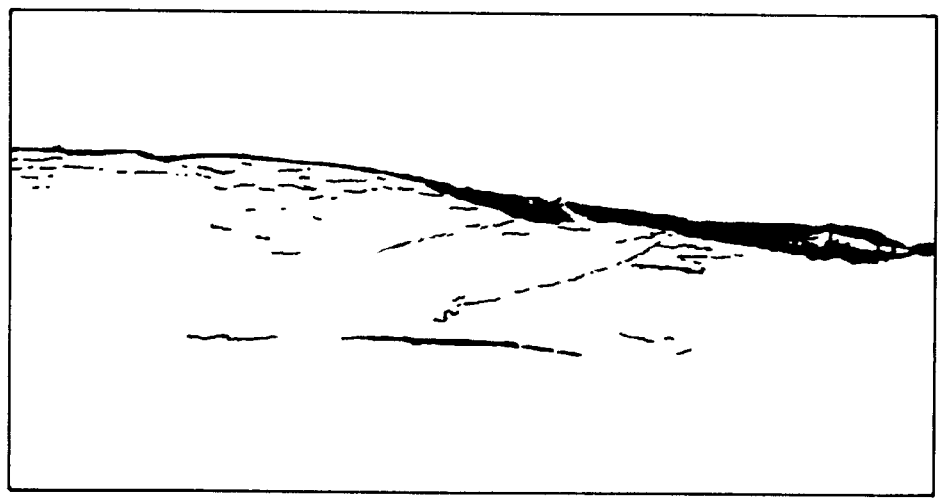
FIG. 5 is a drawing based on a photograph showing a cross section of yet another, defective, prior art insulation.

The process of this invention produced the pieces of insulation shown in cross section in FIGS. 1 and 2. They are free from internal damage. The insulation of FIG. 1 did not incorporate microballoons and was prepared similarly in all significant respects to the procedure of Example 2. Fugitive microballoons were used to induce the exhibited porosity. The insulation of FIG. 3 was prepared from the same mat as the insulation in FIG. 2. That particular mat was cut into sections prior to sol infiltration. The section corresponding to the insulation of FIG. 2 underwent sol infiltration and gelling prior to drying whereas the section corresponding to the insulation of FIG. 3 did not. The pieces of insulation shown in FIGS. 4 and 5, which exhibit cracking and delamination, neither underwent ammoniation and gelation prior to drying nor were they produced according to the ammoniation and ammonia soak time specifications of this invention.

The fundamentals of this invention can be practiced in connection with a variety of different methods for forming ceramic insulation. In particular, these fundamentals can be practiced in connection with the method as is disclosed in U.S. Pat. No. 5,041,321 wherein a plurality of different slurries containing different ceramic fibers are formed and molded in succession to form a single felt mat having interlocking layers of fibers. It is also possible to strengthen insulation made by this method by incorporating glass coating or refractory stitching as disclosed in that patent. This method can be used for forming fibrous ceramic insulation with a honeycomb core, as described in U.S. Pat. Nos. 4,849,176 and 5,000,998; insulation including a water-wall passive cooling system, as described in U.S. Pat. No. 5,322,725; insulation including infused ablative material, as described in U.S. Pat. No. 5,310,592, or insulation including reinforcement cloth bound within the mat by sol-gel glass bonds, as described in U.S. Pat. application Ser. No. 07/537, 339. Each patent or application is incorporated by reference.

The following examples further illustrate the methods of the invention.

EXAMPLE 1

Carborundum HS-95C fibers (5420 g) were added to water (1084 kg) to form a slurry of about 0.5 wt % solids. The slurry was mixed in a tank using an impeller mixer. A portion of the slurry was sucked into a tool having a flat porous surface by vacuum suction (640 mm Hg). The suction was terminated after about 4.5 minutes, which was about 1 minute after the water in the slurry was no longer readily visible when looking into the tool. A flat mat about 7.3 centimeters thick formed. Alumina sol was poured onto the mat such that the sol's volume was 1.5 times the mat's volume. Suction behind the mat was reinstituted and maintained at about 660 mm Hg to assist infiltration of the sol into the mat. The suction was terminated about 1 minute after the sol was no longer readily visible on the mat surface. The mat was then exposed to ammonia for 20 minutes (slightly less than 3 minutes per centimeter of part thickness) in a sealed nylon bag with a small inlet tube connected to an ammonia gas source. The ammonia flow rate was designed to keep the bag fully inflated and at a pressure slightly greater than 1 atmosphere. The mat was allowed an ammonia soak time and gelation period of about 24 hours in the sealed bag at room temperature. The mat was dried by heating to about 88° C. (190° F.), holding at that temperature for about 60 hours, further heating to about 371° C. (700° F.), holding at that temperature for several hours, and then was cooled to room temperature. The sol impregnation, ammoniation, ammonia soak, and drying operations were repeated three times. The resulting part had a z-axis tensile strength of 0.24 MPa (35 psi) and a density of 0.35 g/cm$^3$ (22 lb/ft$^3$). The z-axis is parallel to the part's thickness, that is, perpendicular to the plane of the screen during part formation. We used a 2.5×2.5×5 centimeter (i.e., a 1×1×2 inch) part held in an Instron tensile tester equipped with pins to allow for alignment and to prevent bending of the part during testing.

EXAMPLE 2

Silicon carbide whiskers (500 grams) were dispersed in a blender in water (10 kg). Daxad 37LN10 dispersant (about 2 grams of 10% solids in an aqueous solution) available from W. R. Grace Co. was added. The whiskers, dispersant, and water were mixed with a slurry of water (73 kg)ad Carborundum HS-95C fiber (500 grams) using an impeller mixer: Phenolic microballoons (250 grams) and Daxad CP-2 flocculant (6 grams of 10% solids in an aqueous solution) available from W. R. Grace Co. were then added to the fiberwhisker mixture. The slurry was then stirred and poured over a flat porous surface backed by a vacuum suction of about 660 mm Hg. The suction was terminated about 10 seconds after water on the mat was no longer visible, leaving a flat mat about 5 centimeters thick. Alumina sol was poured onto the mat in an amount of about 1.5 times the mat's volume. The suction behind the mat was reinstituted and maintained at about 660 mm Hg to assist infiltration of the sol into the mat. The mat was exposed to flowing ammonia for 10 minutes (approximately 2 minutes per centimeter of part thickness) in a flow-through bag, and then soaked in the ammonia for about 24 hours in a sealed bag at room temperature. The mat was then dried by heating to about 88° C. (190° F.), holding at that temperature for about 50 hours, and then further heating to about 371° C. (700° F.), and holding at that temperature for several hours. Finally, the mat was cooled to room temperature. The sol impregnation, ammoniation, ammonia soak, and drying operations were repeated twice. The part was then heat treated (about 538° C. (1000° F.) for about 1 hour) to volatilize and remove (i.e., "burnout") the phenolic microballoons. The resulting part was determined by testing as with Example 1 to have a z-axis tensile strength of 0.45 MPa (65 psi) at 0.29 g/cm$^3$ (18 lb/ft$^3$).

EXAMPLE 3

Seven pieces of insulation were produced from the slurry of Example 1 and by a process similar in all significant respects to the process of Example 1. Each sample was cut into 3 specimens and tested using an Instron tensile tester equipped with pins to allow for alignment, and to prevent bending, of the part during testing. Each specimen measured 2.5 centimeter along the x and y axes. Specimens 1–7 measured 2.5 centimeter along the z-axis, specimens 8–14 measured 3.8 centimeters along the z-axis, and specimens 16–21 measured 5.0 inches along the z-axis. The z-axis tensile strengths determined by these tests are presented in Table 2 and demonstrate the improved strength of the insulation of the present invention.

TABLE 2

| Specimen number | Tensile Strength psi | MPa | Specimen number | Tensile Strength psi | MPa |
| --- | --- | --- | --- | --- | --- |
| 1 | 43.6 | 0.301 | 11 | 37.6 | 0.259 |
| 2 | 42.6 | 0.294 | 12 | 38.3 | 0.264 |
| 3 | 38.9 | 0.268 | 13 | 36.1 | 0.249 |
| 4 | 38.6 | 0.266 | 14 | 38.8 | 0.267 |
| 5 | 39.5 | 0.272 | 15 | 30.3 | 0.209 |
| 6 | 38.5 | 0.265 | 16 | 36.1 | 0.249 |
| 7 | 40.5 | 0.279 | 17 | 32.9 | 0.229 |
| 8 | 38.4 | 0.265 | 18 | 33.1 | 0.228 |
| 9 | 42.6 | 0.294 | 19 | 32.2 | 0.222 |
| 10 | 38.8 | 0.267 | 20 | 29.6 | 0.204 |
|  |  |  | 21 | 32.4 | 0.223 |

EXAMPLE 4

Two pieces of insulation were produced as set forth in Example 1 except that the solids content of the slurry was about 0.125 wt %. Each piece was cut into 5 specimens and one specimen of each part was heat-treated to 649° C. (1200° F.). The specimens produced at normal processing temperatures (without heat-treatment) were weaker than those identified in Examples 1 and 3, probably due to the low slurry concentration. The heat treatment, however, produced specimens having significantly increased strength. The results are presented in Table 3 (specimen 5 of each piece was heat-treated to 649° C.; specimens 1–4 were subjected only to normal processing temperatures).

TABLE 3

| Piece 1 | | | Piece 2 | | |
| --- | --- | --- | --- | --- | --- |
| Specimen number | psi | MPa | Specimen number | psi | MPa |
| 1 | 29.8 | 0.205 | 1 | 30.5 | 0.210 |
| 2 | 29.2 | 0.201 | 2 | 29.5 | 0.203 |
| 3 | 30.6 | 0.211 | 3 | 31.8 | 0.219 |
| 4 | 28.4 | 0.196 | 4 | 28.9 | 0.199 |
| 5* | 35.4 | 0.244 | 5* | 37.0 | 0.255 |
| Strength Increase | 20% | | | 23% | |

* = heat treated at 649° C.

EXAMPLE 5

We prepared ten test specimens of ceramic insulation using aluminum powder (nominal size: –325 WSI mesh from Cerac Co.) in conjunction with HS-95C aluminosilicate fibers. Slurries in deionized water included about 0.6 wt % fiber solids with appropriate addition of aluminum to correspond to the normal (theoretical) amount of $Al_2O_3$ which would result from sol-gel processing with three infusions of sol for densification. The slurries included Daxad CP-2 flocculent, Daxad 37LN10 dispersant, and/or Magnifloc 1883 flocculant so that the flocced slurry produced a mat having the aluminum powder dispersed and distributed within the fiber matrix that formed upon vacuum deposition in a 1¾-in diameter forming tool. To assure dispersion of the fibers and powder, the slurry was well mixed with a variable speed impeller mixer. The sample geometry was a cylinder of 1¾-in. diameter and about 2¼ inch length.

Upon forming the mat, an aluminum hydroxide sol (2.5 wt % Al) was infused through eight sample mats leaving the mat wetted but not saturated. Two sample mats were not rinsed with aluminum hydroxide sol (i.e., the standard Yoldas-type sol-gel binder) prior to drying. These samples were tested to see whether the metal powder could replace the use of sol entirely. After the aluminum hydroxide sol treatment, all the samples were exposed to ammonia to complete gelling and were heated treated under the following parameters:

TABLE 4

| Sample Processing Parameters | | | |
| --- | --- | --- | --- |
| PROCESS | 3292A to D | 3294A to D | 3294E to F |
| Ammonia flow time (minutes) | 5 | 10 | 0 |
| Ammonia soak time (days) | 4 | 0.8 | 0 |
| Maximum heat treatment temperature (° F./hours) | 700/0.5 | 1472/4 | 1472/4 |

Then, samples 3293 A to C and 3294 A to C (i.e., six samples) were densified with a second sol infusion with gelling, drying, and firing at 700° F. (370° C.). The completed samples were then glued to aluminum adherends and stretched to failure in a z-axis tensile test. Breaking occurred at the low density end of the samples. Two breaks/sample were run. Table 5 summarizes the test results:

TABLE 5

| Sample | Aluminum Powder Addition wt % | Number of Densification Cycles | Density lb/ft³ | Z-Axis Properties | | | |
|---|---|---|---|---|---|---|---|
| | | | | First Break | | Second Break | |
| | | | | Strength psi | Modulus ksi | Strength psi | Modulus ksi |
| Chemical Oxidation | | | | | | | |
| 3293A | 0 | 1 | 15.3 | 14.3 | 6.0 | 15.0 | 5.8 |
| 3293B | 5 | 1 | 17.0 | 18.0 | 10.6 | 18.2 | 15.0 |
| 3293C | 10 | 1 | 19.2 | 20.3 | 15.5 | 24.3 | 13.9 |
| 3293D | 20 | 0 | 18.5 | 13.2 | 6.4 | 16.2 | 8.1 |
| Thermal Oxidation | | | | | | | |
| 3294A | 0 | 1 | 15.2 | 13.0 | 5.2 | 13.1 | 5.4 |
| 3294B | 5 | 1 | 15.6 | 8.8 | 6.3 | 13.3 | 5.3 |
| 3294C | 10 | 1 | [1]15.2 | [1]10.7 | [1]2.6 | [2]NA | NA |
| 3294D | 20 | 0 | 20.2 | 15.5 | 6.8 | 16.1 | 5.5 |
| 3294E | 20 | 0 | [3]Sample did not survive thermal oxidation cycle. | | | | |
| 3294F | 40 | 0 | Sample did not survive thermal oxidation cycle. | | | | |

[1]The sample broke in fabrication and data is from the low density end of the sample.
[2]NA - Samples were too short for a second break.
[3]Samples were not rinsed with sol prior to oxidation cycle and appeared to oxidize too rapidly.

The data in Table 5 shows that the strength increased with increasing amounts of metal powder and that the strength of the insulation that included metal powder exceeded that of insulation that lacked metal powder. When 20 wt.% metal powder was used, the product had a higher strength without any sol infusion, than a similar part having only a single infusion (i.e., one densification cycle) of sol and no aluminum powder. With 10 wt.% metal powder and one densification cycle, the product's strength is comparable to products using the old method where two or three densification cycles were used. Achieving comparable strength while avoiding one or more densification cycles greatly reduces the manufacturing time and cost.

The modulus data for these specimens shows that there is an increase in the fiber-to-fiber bonding with addition of aluminum powder followed by its chemical oxidation at room temperature. For the specimens with 5 wt.% and 10 wt.% aluminum powder, the modulus was twice that for comparable specimens that did not use the metal powder. Qualitative X-ray diffractio[008e] (XRD) showed unreacted alumium. Therefore, the potential benefits of this process are not fully demonstrated in these preliminary tests.

Specimens 3294B and 3294C appear to signal that rinsing the mat with sol prior to firing might lead to coating the metal with sol, thereby impairing complete reaction upon heating. XRD again revealed unreacted alumium. XRD also revealed the presence of cristobalite, which indicates overheating during oxidation and fiber degradation. These observations could explain the reduced strength observed in these parts.

The five minutes longer ammoniation of the 3294 series specimens might also account for the reduced strength in these specimens.

For Samples 3294E and 3294F, the exothermic oxidation reaction was too fast. Sample 3294E had a crumbly center with evidence of recystallization of the fibers. Sample 3294F shrank to about on-third its original size which was evidence that high temperatures created a liquid phase. Accordingly, these tests were inconclusive about whether aluminum metal powder could replace sol infusion entirely.

In a cost comparison of materials, the process of incorporating metal powder to eliminate the need for additional densification cycles reduces the raw material costs by $100/ft³ to $400/ft³ and the manufacturing time by 2–5 days. Less oven time is required which translates into energy savings. The production cost, of fiberform insulation using metal powder then, is significantly reduced.

Although specific examples of the present invention and its application are set forth, it is not intended that these examples are exhaustive or limiting of the invention. The detailed description and the examples are intended to acquaint others skilled in the art with the invention, its principles, and its practical application. Those skilled in the art may adapt and apply the invention in its numerous forms based on this description, as may be best suited to the requirements of a particular use.

We claim:

1. Ceramic insulation having a density between about 8–25 lb/ft³, a consistent microstructure, and improved strength, comprising a sol-gel binder fully gelled through the entire thickness of the insulation and a ceramic component selected from the group consisting of ceramic fibers, ceramic microparticles, and mixtures thereof, the insulation optionally including a reacted metal forming refractory ceramic bonds between ceramic components, the insulation being heat treated at about 1000° F. to have a tensile strength of at least about 0.244 MPa.

2. The ceramic insulation of claim 1 having uniform porosity formed by the removal of fugitive microparticles.

3. A ceramic insulation obtainable by:
   (a) forming a slurry of ceramic fibers, ceramic microparticles, or mixtures thereof; optionally, fugitive microparticles; and optionally, a metal;
   (b) molding a slurry to form a soft felt mat of the ceramic components of the slurry, the mat having a thickness;
   (c) optionally, converting the metal to a binder to form bonds between the ceramic components;
   (d) impregnating the mat with a sol prior to drying the mat;
   (e) gelling the sol to form a sol-gel binder which bonds between the ceramic components so that the mat is dimensionally stabilized; and
   (f) drying the mat to produce the ceramic insulation, the insulation having a consistent microstructure. a tensile strength of at least about 0.244 MPa, uniform porosity, and a density of about 15–22 lb/ft³.

4. The ceramic insulation of claim 3, wherein the process includes the additional step of:

heat treating the ceramic insulation at a temperature of at least about 537.8° C. (1000° F.).

5. The ceramic insulation of claim 4 wherein the gelling step comprises exposing the impregnated mat to ammonia for not more than about 4 min/cm of the mat's thickness.

6. The ceramic insulation of claim 3 wherein the metal is in powder form, the metal is included in the slurry; and wherein converting the metal involves reacting the metal to form an oxide or nitride.

7. The insulation of claim 6 wherein the metal is aluminum, aluminum/magnesium (2:1), aluminum/silicon (2:1), aluminum/yttrium (5:3), cerium, silicon, tantalum, yttrium, or mixtures thereof.

8. A ceramic insulation obtainable by:

forming a slurry of ceramic components selected from the group consisting of fibers, microparticles, and mixtures thereof, wherein the slurry includes an effective amount of a metal power sufficient to increase the z-axis specific tensile strength of the insulation;

(b) molding the slurry to form a wet mat;

(c) impregnating the wet mat with a sol;

(d) diffusing ammonia into the impregnated mat by exposing the mat to a flowing ammonia environment and, thereafter, subjecting the mat to an ammonia soak time in a quiescent ammonia atmosphere sufficient to convert the sol to gel to produce a consistent microstructure throughout the mat;

(e) drying the mat to produce the ceramic insulation; and (f) heat treating the mat to increase its tensile strength.

9. The ceramic insulation of claim 8 wherein the slurry contains fugitive microparticles.

10. The ceramic insulation of claim 9 wherein the process includes the additional step of heating the insulation to volatilize and to remove the fugitive microparticles.

11. Ceramic insulation having a density of about 8–25 lb/ft$^3$ obtainable by:

(a) forming a slurry of ceramic components selected from the group consisting of ceramic fibers, ceramic microparticles, and mixtures thereof, and a binding amount of metal powder;

(b) optionally, adding fugitive microballoons or ceramic whiskers or both to the slurry;

(c) molding the slurry to form a mat;

(d) converting the metal powder to an oxide or nitride to form bonds between the ceramic components, the metal being between about 5–50% of the weight of the ceramic components.

12. The insulation of claim 11 wherein the process further comprises:

(a) infusing a sol binder into the mat; and (b) gelling the sol to form bonds between the ceramic components.

* * * * *